(12) United States Patent
Seppänen et al.

(10) Patent No.: US 10,750,014 B2
(45) Date of Patent: Aug. 18, 2020

(54) MANAGEMENT OF CALL CONNECTION ATTEMPT

(71) Applicant: Telia Company AB, Solna (SE)

(72) Inventors: Juho Seppänen, Helsinki (FI); Kari-Matti Puukangas, Helsinki (FI)

(73) Assignee: TELIA COMPANY AB, Solna (SE)

( * ) Notice: Subject to any disclaimer, the term of this patent is extended or adjusted under 35 U.S.C. 154(b) by 0 days.

(21) Appl. No.: 16/174,901

(22) Filed: Oct. 30, 2018

(65) Prior Publication Data

US 2019/0132447 A1    May 2, 2019

(30) Foreign Application Priority Data

Oct. 31, 2017  (FI) ...................................... 20175963

(51) Int. Cl.
*H04L 12/58* (2006.01)
*H04M 3/487* (2006.01)
*H04M 3/42* (2006.01)
*H04M 3/533* (2006.01)
*H04M 1/64* (2006.01)

(52) U.S. Cl.
CPC ........... *H04M 3/4874* (2013.01); *H04M 1/64* (2013.01); *H04M 3/42059* (2013.01); *H04M 3/42374* (2013.01); *H04M 3/4872* (2013.01); *H04M 3/53366* (2013.01); *H04M 3/53391* (2013.01); *H04M 2201/60* (2013.01); *H04M 2203/306* (2013.01); *H04M 2203/4527* (2013.01); *H04M 2207/18* (2013.01)

(58) Field of Classification Search
CPC ........... H04M 3/4874; H04M 3/42059; H04M 3/53366; H04M 2201/60; H04M 2203/306; H04M 2203/4527; H04M 2207/18

USPC .................................. 455/412.1, 550.1, 418
See application file for complete search history.

(56) References Cited

U.S. PATENT DOCUMENTS

| | | | | |
|---|---|---|---|---|
| 6,215,859 B1 * | 4/2001 | Hanson | ................. | H04M 3/533 379/88.12 |
| 6,219,413 B1 * | 4/2001 | Burg | ...................... | H04L 29/06 370/352 |
| 6,815,677 B2 | 11/2004 | Nagai et al. | | |

(Continued)

FOREIGN PATENT DOCUMENTS

| | | | | |
|---|---|---|---|---|
| JP | 02012186778 A | * | 9/2012 | .............. H04M 3/42 |
| WO | 2005/062593 A1 | | 7/2005 | |
| WO | 2005/088994 A1 | | 9/2005 | |

OTHER PUBLICATIONS

Finnish Search Report, dated May 15, 2018, from corresponding FI application No. 20175963.

(Continued)

*Primary Examiner* — Danh C Le (74) *Attorney, Agent, or Firm* — Young & Thompson (57) ABSTRACT

Disclosed is a method for providing information with a voice message to a subscriber A in response to a receipt of call connection attempt in a terminal device of a subscriber B, the method includes: detecting the call connection attempt from the subscriber A in the terminal device of the subscriber B; generating a message including data carrying a dedicated voice message to the subscriber A; outputting the generated message to the subscriber A. Also disclosed is relates to a system implementing the method and a computer program product.

20 Claims, 3 Drawing Sheets

(56) References Cited

U.S. PATENT DOCUMENTS

| | | | |
|---|---|---|---|
| 6,947,528 B1* | 9/2005 | Ko | H04M 1/6505 379/68 |
| 7,917,178 B2 | 3/2011 | Watson | |
| 9,042,526 B2* | 5/2015 | Rose | H04L 51/066 379/88.22 |
| 10,122,682 B1* | 11/2018 | Salour | H04M 7/006 |
| 2004/0081297 A1 | 4/2004 | Ho et al. | |
| 2005/0129191 A1* | 6/2005 | Kokko | H04M 3/53366 379/88.13 |
| 2007/0004400 A1* | 1/2007 | McClung | H04M 3/42263 455/426.1 |
| 2008/0013471 A1* | 1/2008 | Kim | H04L 51/04 370/312 |
| 2008/0032674 A1* | 2/2008 | Kwon | H04M 3/53341 455/412.2 |
| 2008/0051067 A1* | 2/2008 | Kwon | H04M 3/533 455/413 |
| 2008/0096587 A1 | 4/2008 | Rubinstein | |
| 2009/0304170 A1* | 12/2009 | Bettis | H04M 3/53316 379/207.11 |
| 2010/0020944 A1 | 1/2010 | Ray | |
| 2010/0215161 A1* | 8/2010 | Baccay | H04M 1/575 379/142.04 |
| 2011/0169908 A1* | 7/2011 | Lee | G06F 3/016 348/14.02 |
| 2012/0170730 A1* | 7/2012 | Rothschild | H04M 3/4878 379/114.13 |
| 2013/0288662 A1* | 10/2013 | McDonald | H04M 3/06 455/422.1 |
| 2014/0100961 A1* | 4/2014 | Lee | G06Q 30/0267 705/14.64 |
| 2014/0169539 A1* | 6/2014 | Mumick | H04M 3/48 379/88.23 |
| 2015/0312409 A1* | 10/2015 | Czarnecki | H04M 3/42382 455/414.1 |
| 2016/0072955 A1* | 3/2016 | Barkan | H04M 3/42212 455/417 |
| 2016/0147435 A1* | 5/2016 | Brody | G06F 3/0484 715/863 |
| 2016/0205245 A1* | 7/2016 | Kim | H04M 1/576 455/414.1 |
| 2016/0219150 A1* | 7/2016 | Brown | H04M 3/5235 |
| 2017/0126668 A1* | 5/2017 | Mahiddini | H04L 63/18 |
| 2017/0230499 A1* | 8/2017 | Mumick | H04W 4/12 |
| 2017/0230502 A1* | 8/2017 | Athias | H04M 3/42263 |
| 2018/0114225 A1* | 4/2018 | Wang | H04L 9/32 |

OTHER PUBLICATIONS

European Search Report for Application No. 18 20 0387 dated Mar. 15, 2019.

* cited by examiner

MANAGEMENT OF CALL CONNECTION ATTEMPT

TECHNICAL FIELD

The invention concerns in general the technical field of telecommunications. More particularly, the invention concerns management of call.

BACKGROUND

It is a common situation that a callee is not able to answer to an incoming call from a caller. The reason for the situation may be that the callee resides out-of-service area of a mobile telecommunication network, he/she may be busy i.e. having another call on-going or the callee is in a situation where he/she just cannot answer the call, e.g. in a meeting. In order enable the caller to leave at least some information with respect to a topic of the call there is developed so called voicemail service in which the caller may leave a message to the callee. This is implemented so that the call connection attempt is forwarded to a server implementing the voicemail service, which plays a standard or a custom message setup for the callee and after the message the caller may leave his/her message. The callee may listen to the message afterwards. However, this kind of voicemail service does not enable the callee to leave such a customized message to the caller which may reflect the situation of the callee at the time of the call connection attempt, because the message of the voicemail is stored in advance by the callee in the service.

Another approach for managing the incoming calls at least to some extent is that there are developed services by means of which the callee may respond with textual information, such as with a text message, to the incoming call connection attempt which he/she cannot, or is not willing to, answer. This functions in such a manner that when the call connection attempt reaches the callee the callee's terminal device provides an option to send a message to the caller. The message is predetermined i.e. the textual content is pre-stored in the memory of the terminal device in order to enable rapid responding to the incoming call and the callee selects the textual content for the message to be transmitted to the caller. In this manner the caller receives information that the callee cannot take the call at the moment.

In spite of the existing solutions providing the callee tools for reacting the incoming call connection attempt without answering the call there is a need and a possibility to develop further solutions in the area which broaden an interaction of the callee with the caller.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method and a system for providing information between parties in a context of call connection attempt. Another objective of the invention is that the method and the system enables a transfer of information as a voice message.

The objectives of the invention are reached by a method, a computer program product and a system as defined by the respective independent claims.

According to a first aspect, a method for providing information with a voice message to a subscriber A in response to a receipt of call connection attempt in a terminal device of a subscriber B is provided, the method comprises: detecting the call connection attempt from the subscriber A in the terminal device of the subscriber B; generating a message comprising data carrying a dedicated voice message to the subscriber A; outputting the generated message to the subscriber A.

The generation of the message comprising data carrying the dedicated voice message to the subscriber B may be performed by one of the following: initiating a voice recording application for recording the dedicated voice message in response to the detection of the call connection attempt in the terminal device of the subscriber B; selecting the dedicated voice message to the subscriber A among a plurality of voice messages in accordance with an identity of the subscriber A. The identity of the subscriber A is an identity of a mobile communication network.

The data of the dedicated voice message may be stored in a memory of the terminal device of the subscriber B. The stored data may be transferred to a server device from the memory of the terminal device of the subscriber B. Furthermore, the stored dedicated voice message may be output to the subscriber A in response to a receipt of an incoming call in an entity storing the dedicated voice message, wherein the incoming call may be generated by a communication network node in response to a receipt of a signal representing a predetermined state of the subscriber B with respect to the call connection attempt. For example, the predetermined state of the subscriber B with respect to the call connection attempt is one of the following: busy state, no answer state.

Moreover, a generation of the message comprising data carrying a dedicated voice message to the subscriber A further comprises a generation of a transcript of the voice message by a voice-to-text conversion function.

According to a second aspect, a computer program product comprising at least one computer-readable storage medium having computer-executable program code instructions stored therein is provided for performing the method as described above when the computer program product is executed on at least one network node.

According to a third aspect, a system is provided, wherein the system comprising a terminal device for a subscriber A and a terminal device for a subscriber B wherein the terminal devices are communicatively coupled to a mobile communication network for providing information with a voice message to the subscriber A in response to a receipt of call connection attempt in a terminal device of a subscriber B, wherein the terminal device of the subscriber B is configured to detect the call connection attempt from the subscriber A, and wherein the system is configured to: generate a message comprising data carrying a dedicated voice message to the subscriber A, output the generated message to the subscriber A.

The generation of the message comprising data carrying the dedicated voice message to the subscriber B may be arranged by one of the following: initiating a voice recording application for recording the dedicated voice message in response to the detection of the call connection attempt in the terminal device of the subscriber B; selecting the dedicated voice message to the subscriber A among a plurality of voice messages in accordance with an identity of the subscriber A.

The data of the dedicated voice message may be configured to be stored in a memory of the terminal device of the subscriber B.

The stored data may be configured to be transferred to a server device belonging to the system from the memory of the terminal device of the subscriber B.

The stored dedicated voice message may be arranged to be output to the subscriber A in response to a receipt of an incoming call in an entity configured to store the dedicated voice message, wherein the incoming call is arranged to be generated by a communication network node in response to a receipt of a signal representing a predetermined state of the subscriber B with respect to the call connection attempt.

The predetermined state of the subscriber B with respect to the call connection attempt may be one of the following: busy state, no answer state.

Moreover, the system may further a voice-to-text conversion function for generating a transcript of the voice message when generating the message comprising data carrying a dedicated voice message to the subscriber A.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

FIG. 1 illustrates schematically an example of an environment into which the invention may be implemented to.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Some aspects of the present invention relate to a solution for enabling a callee i.e. a subscriber B to take actions in response to a receipt of call connection attempt i.e. an incoming call. The actions may refer to a generation of a message to a caller i.e. subscriber A wherein the message comprises a voice message, which is dedicated to the subscriber A. The message, or at least the content of the voice message, is provided to the subscriber A e.g. in a manner of transmitting the message to the subscriber A or outputting the content of the message from some other entity. In the described manner the subscriber B may inform the subscriber A why he/she cannot answer the call i.e. accept the call connection attempt.

Figure 1:
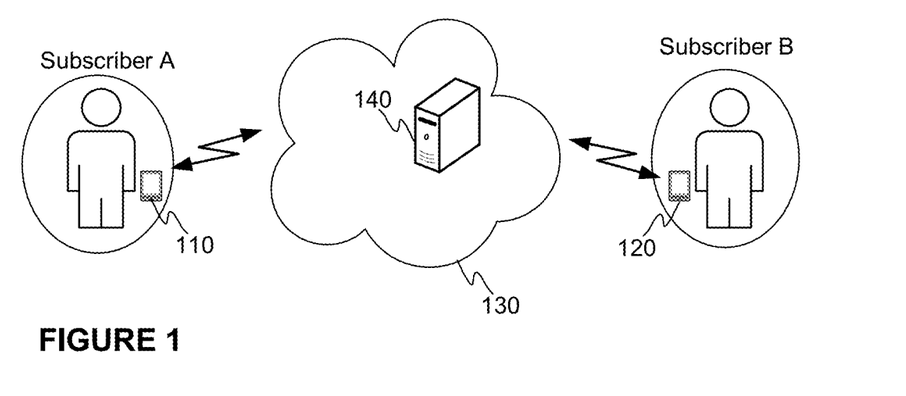

At least some aspects of the present invention are now described by referring to FIG. 1. In the FIG. 1 there is schematically illustrated a system according to an embodiment of the invention in which a subscriber A and a subscriber B both possessing a terminal device referred with 110 and 120 in FIG. 1, correspondingly. The subscribers may communicate with each other over a mobile communication network 130, which may serve the subscribers, i.e. the terminal devices 110, 120 of the subscribers, in a wireless manner. The mobile communication network 130 may be coupled to a server device 140, which may reside in the mobile communication network 130 or be communicatively coupled to the mobile communication network 130 as an external entity. The server device 140 may perform at least some operations for implementing the present invention according to at least one embodiment of the invention, as will be described. On the other hand, in some embodiment of the invention the solution according to the invention may be implemented without the server device 140. The mobile communication network 130 shall be understood to cover arrangements in which only one mobile communication network serves the subscribers or wherein a plurality of mobile communication networks is arranged to cooperate for serving the subscribers.

Figure 2:
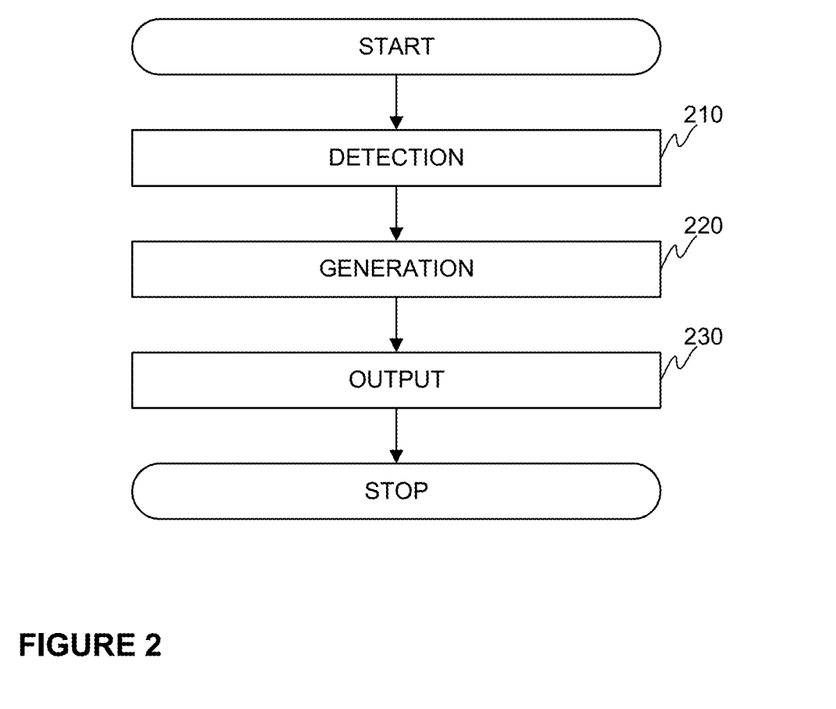
FIG. 2 illustrates schematically a method according to an embodiment of the invention.

FIG. 2 schematically illustrates a method according to an example of the invention. A starting point for the method may be that the subscriber A initiates a call connection attempt towards the subscriber B with his/her terminal device 110. The call connection attempt may be carried to the terminal device 120 of the subscriber B over the mobile communication network 130. The call connection attempt may refer to signaling representing the call connection attempt on a signaling layer of the mobile communication network.

Regarding Step 210:

In response to a setup of the call connection attempt by the subscriber A the call connection attempt may be carried to the subscriber B over one or more mobile communication network 130. In step 210 a terminal device of the subscriber B may be configured to detect an incoming call connection attempt. The detection may be performed on a basis of information transmitted in the context of the call connection attempt, such as on a basis of data carried in a call setup message delivered in the signaling, for example.

The detection of the call connection attempt may also comprise a detection of the subscriber A on a basis of information carried in the context of the call connection attempt, e.g. in a related signaling. The detection of the subscriber A may comprise obtaining an identifier of the subscriber A from the call connection attempt. The identifier representing the identity of the subscriber A may e.g. be an identity of the subscription of the subscriber A in the mobile communication network 130. The identity of the subscription may e.g. refer to a Mobile Station International Subscriber Directory Number (MSISDN) as a non-limiting example of the identity. Thus, the terminal device 120 of the subscriber B may be configured to obtain the identifier from the received call connection attempt. The obtaining of the identifier may e.g. be performed with an application executed by a processing unit of the terminal device 120, which is arranged to implement at least this function. The obtaining may refer to copying the identifier from the information carried in the call connection attempt, for instance.

Regarding Step 220:

In response to the detection of the call connection attempt e.g. in the manner as described in the context of step 210 a message may be generated 220 for delivering it to the subscriber A if the subscriber B is not willing to accept the call connection attempt. The generation of the message may be initiated either automatically or in response to a predetermined operation performed e.g. the user of the terminal device 120 of the subscriber B. The automatic initiation of generating the message may be based on a predetermined state into which the terminal device 120 and/or one or more applications residing in the terminal device 120 are set, for example. In some embodiment a definition of the predetermined state may receive information e.g. on a time or a location as an input. The predetermined operation performed by the user, in turn, may refer to an action taken in response to a receipt of the call connection attempt indicated by the terminal device 120 of the subscriber B. The indication may, for example, refer to a generation of a signal by the terminal device, wherein the signal may e.g. be sound signal, vision signal, haptic signal or any combination of these, which is detectable by the user of the terminal device in one or more manner. In some embodiment the terminal device 120 may be configured to indicate the incoming call connection attempt to the user and to prompt a user to initiate the generation of the message. The prompting may be performed through a user interface of the terminal device 120, for example.

The generation of the message 220 may comprise, according to an example of the invention, that the subscriber B generates a dedicated voice message to the subscriber A. The generation of the voice message may comprise an initiation of a voice recording application residing in the terminal device 120 for recording the dedicated voice message. The user outputs the voice message which is conveyed to the voice recording application through a sound detecting device residing e.g. in the terminal device 120 and possibly stored at least temporarily in a memory accessible to the terminal device 120. In other words, the data carrying the voice message is stored in the memory accessible to the terminal device 120.

The generation of the message 220 in the context of at least some example of the present invention shall also be understood to cover a solution in which a voice message is selected to the subscriber B from a memory accessible to the terminal device 120. The memory may store one or more pre-stored voice messages. The selection of the voice message may be based on at least one predetermined criterion. The criterion may e.g. be an identity of the subscriber A if determined in the step 210. In other words, the voice message is selected in accordance with the identity of the subscriber A and in this manner the voice message generated to the subscriber A may be considered as a dedicated voice message to the subscriber A in question.

Moreover, the step of generating the message comprising data carrying the dedicated voice message may comprise a sub-step in which the stored data may be transferred to a network element, such as a server 140, from the terminal device 120 of the subscriber B. In such an example of the invention the user of the terminal device 120 of the subscriber B may generate the voice message and store it to a memory of the terminal device 120 from where it is transferred to the network element. Some other example of the present invention may be arranged so that an application configured to record the voice message is configured to directly transfer the recorded data to data storage accessible through a network. For example, the data storage may reside in the network element, i.e. in the server 140 in the example of FIG. 1.

Regarding Step 230:

Now the recipient of the call connection attempt has generated a message comprising a dedicated voice message to the subscriber A, which message is stored in a predetermined data storage residing either in a memory of the terminal device 120 of the subscriber B or in data storage residing in a network. In step 230 the message is output 230 to the subscriber A. In order to output the message i.e. the voice message to the subscriber A it may be arranged that in case of an application residing and executed in the terminal device 120 of the subscriber B the application accepts the call connection request and answers the call and outputs the voice message to the subscriber A who has initiated the call connection attempt. According to an example of the invention the application may be configured to operate so that it is configured to indicate a predetermined state, such as a busy state, towards a network node, such as a mobile switching centre (MSC) or a Call Session Control Function (CSCF), managing the call connection attempt in the network 130 side. The indication of the busy state of the subscription of the subscriber B may be configured to cause the network node to divert the call connection attempt to another destination address. The information on this may be stored in a subscriber profile stored in at least one register being accessible to the network node. The information may e.g. comprise an indication on the call divert setting as well as the destination address for the call divert. The destination address defined for the call divert advantageously directs back to a subscription also implemented in the terminal device 120 of the subscriber B. The application executed in the terminal device 120 is advantageously configured to accept the call connection request carried as the divert call and output the voice message generated by the subscriber B in one manner as described in the previous step to the subscriber A. In other words, the application residing and executed in the terminal device 120 of the subscriber B is configured to detect the incoming call connection attempt as the divert call in response to the detection of the original call connection attempt and in response to that to accept the call and output the voice message to the subscriber A.

In the example of the present invention in which the generated message is transferred to a server device 140, or generally speaking to a network node, from the terminal device 120 of the subscriber B a divert call feature of a mobile communication network may also be applied. Namely, since the subscriber B does to answer the call connection attempt, i.e. accept the call, a signaling indicating this may be generated towards a network node, such as a mobile switching centre (MSC) or a Call Session Control Function (CSCF) in IP Multimedia Subsystem (IMS) implementation, managing the call connection attempt in the network 130 side. The indication of the non-acceptance of the call connection attempt may e.g. be an indicator of a busy state or an indicator of a no answer state. In response of a receipt of the indication in the network node managing the call connection attempt may be configured to cause the network node to divert the call connection attempt to another destination address. In this implementation the other destination address may refer, or point, to the server device 140, or any other network node, storing the message comprising the data representing the voice message. Again, the network node managing the call connection attempt may be configured to obtain necessary information, such as the destination address of the server device 140, from a register storing subscriber profiles. The information stored in the register may also comprise an indication on the call divert setting as well as the destination address for the call divert. Now, the server device 140 may be configured to output the stored message dedicated to the subscriber A in response to a receipt of the divert call. For example, the server device 140 may be configured to determine on the basis of information carried in the divert call the subscriber A to whom the voice message stored in the memory accessible to the server device 140 is dedicated to. This may be performed e.g. on a basis of a predetermined identifier carried in the divert call signaling. In some embodiment this may refer to a network identifier of subscriber A. Alternatively or in addition, the determination may be based on a network identifier of the subscriber B. The network identifiers may e.g. be MSISDN numbers. Thus, the voice message to be output is selected on the basis of at least one of the mentioned identifiers and in response to the selection of the dedicated voice message to the subscriber A the divert call may be accepted and the voice message is output to the subscriber A. In some embodiment it may be arranged that if no divert call is received by the subscriber B, the generated voice message may be transferred as an audio message to the subscriber A from the server device 140. This kind of situation may arise if the subscriber A cancels the call before it is directed to the server device 140. One non-limiting way to implement the described feature with the delivery of the audio message may be based on a utilization of a timer in monitoring of the establishment of the divert call. The timer may define a period of time during which the divert call with predetermined criteria, such as carrying information on at least one subscriber A or B, shall be received in the server and if this is not the case a delivery of the audio message may be initiated.

In some further example of the invention further sophisticated features may be implemented. Namely, according to an example of the invention a procedure may be arranged for a situation in which the subscriber B has not generated the message in time i.e. before the divert call is received in the server device 140. This corresponds to a situation wherein the generation of the message by the subscriber B takes too long or its transfer to the server device 140 is delayed, for example. The absence of the message may e.g. be detected in response to a query towards data storage arranged to store the messages into which a null response is returned. In response to a detection of null response the server device may be configured to take a predetermined action with respect to the divert call. The predetermined action may e.g. be that the divert call is again answered, but a default voice message may be output to the subscriber A. The default voice message may refer to a voice message which may be set as a default voice message i.e. deviating from the dedicated voice message to the subscriber A in question. The default voice message may e.g. be stored in data storage accessible to the server device 140.

A further implementation of the present invention according to an example of the invention may be that in the above described situation in which the absence of the message is detected in response to the query a timer may be initiated. The timer is set to run a predetermined period of time which is waited for re-checking an availability of the message in the server device 140. In other words, when the timer is run out a new query is initiated towards the server device 140 and if the generated message is found from the server device 140 at that time, it is output to the subscriber A as described. If the message is not found from the server device 140, the default voice message may be output as described. In some implementation a ringing tone is output during the waiting time, such as during the run of the timer.

In the description of at least some examples of the present invention it is described that the generated message comprising the voice message may be output to the subscriber A from the location it is stored. However, the output of the message shall be understood to cover an implementation wherein the generated message is transmitted, i.e. sent, in a predetermined format to the subscriber A and the subscriber A may output the message on his/her own terminal device 110. For example, the generated message may be output as a multimedia message, as an email message or as any other message type with an applicable application. Naturally, the destination address for the subscriber A shall be known. Such information may be stored in the server device 140 and it may have been provided by the subscriber B e.g. in the context of message generation either automatically or manually.

Figure 3A:
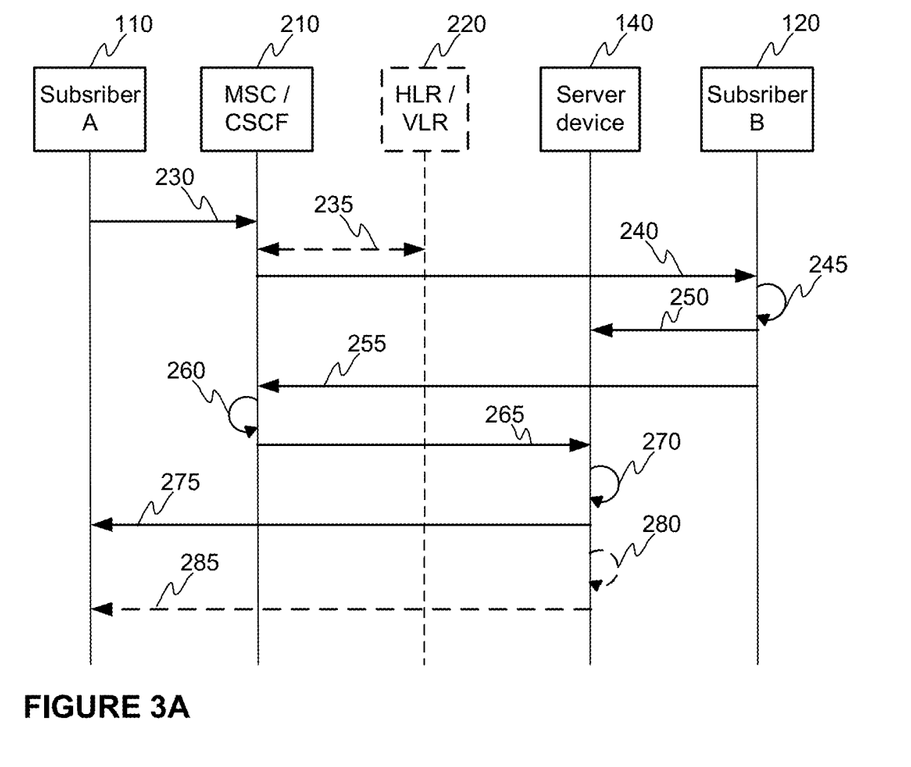
FIGS. 3A and 3B illustrate schematically signaling between different entities according to some embodiments of the invention.
Figure 3B:
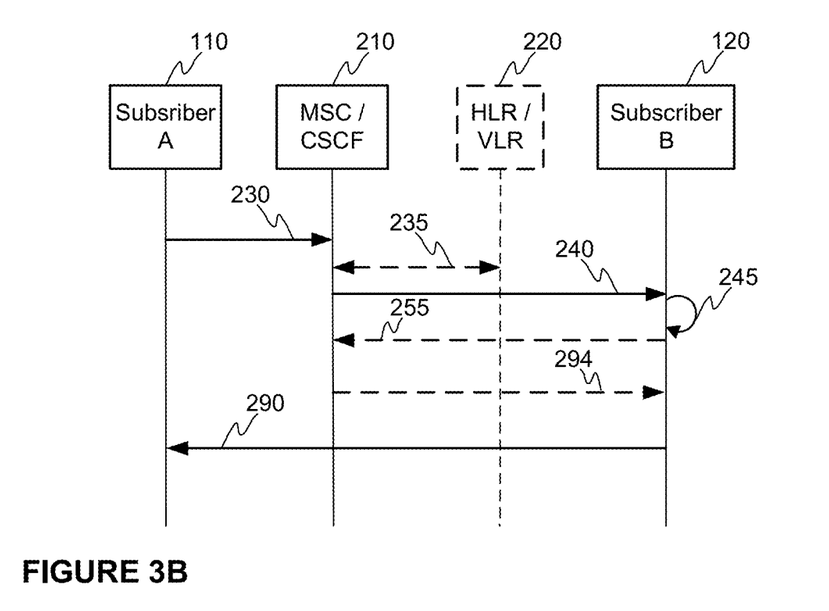

FIGS. 3A and 3B illustrate schematically signaling between different entities according to some examples of the present invention. In the illustrated examples the network node managing the call connection attempt is MSC or CSCF and a register storing necessary information is either Home Location Register (HLR) or Visitor Location Register (VLR) or Home Subscriber Server (HSS) in case of CSCF implementation. The mentioned entities are non-limiting examples of network elements by means of which at least some examples of the invention may be described. Now, the subscriber A may initiate a call connection attempt to subscriber B with his/her terminal device 110, as shown in FIG. 3A. The call connection attempt 230 may be directed to the MSC or CSCF 210 over one or more mobile communication network elements. In some example of the invention the MSC 210 may inquire necessary information from a register, i.e. from HLR or VLR 220 in this case, or from HSS in CSCF implementation. The information may comprise an indication if the subscriber B has a service according to the present invention as well as information on a destination address for the service, such as for a server device 140 involved in an implementation of the service, for example. Naturally, the inquired information may comprise further information which is needed for directing the call connection attempt in the network, such as a location of the subscriber B. In case the network implementation is based on IMS the necessary information may be available in the CSCF without any specific inquiry from a register. In response to an availability of the information in the MSC or CSCF 210 the call connection attempt may be signaled 240 to the terminal device 120 of the subscriber B. The signaling may cause the terminal device 120 to indicate the incoming call connection attempt to the subscriber B and the subscriber B may either answer or not answer the call connection attempt. In case the subscriber B decides not to answer he/she may initiate a generation of a message 245 the content of which is to be delivered to the subscriber A. This may also be achieved automatically e.g. by defining a specific setting in the terminal device 120 or in the application. The generation of the message 245 may comprise a recording of a voice message for the subscriber A by means of which the subscriber B may e.g. provide information to the subscriber A. The recording of the message, such as customized message for the subscriber A, may be performed at least in part concurrently with the rejection phase of the call or after it, for example. Alternatively, the generation of the message may comprise a selection of a pre-recorded voice message stored in data storage to the subscriber A. The generated message may be transferred 250 to a server device 140. Now, at some point an indication of a state of the subscriber B with respect to the call connection attempt may be indicated to the MSC or CSCF 210 with signaling 255. The indicated state, which may cause the next operation according to the example as illustrated in FIG. 3A, may e.g. be that a busy state of the subscriber B is indicated i.e. the subscriber B may have an on-going call when the call connection attempt reaches the terminal device 120 of the subscriber B or the subscriber B has rejected the call connection attempt. Furthermore, the indicated state may be so called no answer state, which refers to a situation in which a time out is reached for the call connection attempt because the subscriber B did not answer the call connection attempt within a predetermined period of time. The period of time may e.g. be defined in the register, such as HLR or VLR 220, either by the system management or by the subscriber B. In response to detecting the pre-determined state 260 the MSC or CSCF 210 may be configured to initiate a divert call 265 to the server device 140. Based on information carried in the divert call the server device 140 may be configured to retrieve the message dedicated to the subscriber A 270 and output the voice message in the retrieved message to the subscriber A 275 for providing the information to the subscriber A. The signal 275 may also refer to transmit of the message to the subscriber A for outputting, as discussed earlier. In some other example of the invention the solution may comprise a step, in response to detection that there is no message for the subscriber A 280, of outputting a default voice message to subscriber A 285. As is clear from the description above the divert call is answered by the server device 140 when outputting the voice message from the server device 140. On the other hand, if the voice message is delivered as a message (also referred with arrow 285 in FIG. 3A) to the terminal device 110 of the subscriber A for outputting the divert call may not necessarily be answered by the server device 140, but the server device 140 may be configured to obtain necessary information, such as information on a destination address of the subscriber A as well as information that the dedicated message comprising the voice message is to be sent to the subscriber A.

FIG. 3B illustrates schematically signaling between different entities according to another example of the present invention. Again, a subscriber A may initiate a call connection attempt 230 to subscriber B with his/her terminal device 110, as shown in FIG. 3B. The call connection attempt 230 may be directed to the MSC or CSCF 210 over one or more mobile communication network elements. In some example of the invention the MSC 210 may inquire necessary information from a register, i.e. HLR or VLR 220 in this case. The information may comprise an indication if the subscriber B has a service according to the present invention as well as information on a destination address for the service, for example. Naturally, the inquired information may comprise further information which is needed for directing the call connection attempt in the network, such as a location of the subscriber B. In case the network implementation is based on IMS the necessary information may be available in the CSCF without any specific inquiry from any specific register. In response to an availability of the information in the MSC or CSCF 210 the call connection attempt may be signaled 240 to the terminal device 120 of the subscriber B. The signaling may cause the terminal device 120 to indicate the incoming call connection attempt to the subscriber B and the subscriber B may either answer or not answer the call connection attempt. In case the subscriber B decides not to answer he/she may initiate a generation of a message 245 the content of which is to be delivered to the subscriber A. This may also be achieved automatically e.g. by defining a specific setting in the terminal device 120 or in the application. The generation of the message 245 may comprise a recording of a voice message for the subscriber A by means of which the subscriber B may e.g. provide information to the subscriber A. Alternatively, the generation of the message may comprise a selection of a pre-recorded voice message to the subscriber A. The pre-recorded voice message or voice messages may be stored in data storage of the terminal device 120, for example. Moreover, the application executing the service as described may be configured to answer to the call connection attempt 240 in response the message comprising the voice message is generated and output the generated message to the subscriber A over the active call connection (indicated with signal 290 in FIG. 3B). The signal 290 shall also be understood to cover an option in which the generated message is transferred to the terminal device 110 of the subscriber A and output there. Alternatively to this, it may also be arranged that a call divert feature is utilized. In such an implementation an indication of a state of the subscriber B with respect to the call connection attempt may be indicated to the MSC or CSCF 210 with signaling 255. The indicated state, which may cause the next operation, may e.g. be that a busy state of the subscriber B is indicated i.e. the subscriber B may have an on-going call when the call connection attempt reaches the terminal device 120 of the subscriber B or that a time out is reached for the call connection attempt, which refers to a not answering the call connection attempt in a predetermined period of time. The period of time may e.g. be defined in the register, such as HLR or VLR 220, either by the system management or by the subscriber B. In response to detecting the predetermined state 260 the MSC or CSCF 210 may be configured to initiate a divert call 294 to the terminal device 120 of the subscriber B. The destination address for the divert call in the service as described may e.g. be defined in the register from which information with respect to the subscriber B may be obtained. The destination address for the divert call may deviate from the one into which the original call connection attempt is signaled (cf. signal 240). This is due to a fact that in the IMS implementation the same subscription may comprise a plurality of destination addresses, e.g. destination numbers, and for the divert call a dedicated destination address may be defined. This kind of arrangement with different destination addresses, such as destination numbers, has an advantage that it enables a detection of a call for outputting the voice message based on the destination address. The application executed for the service in the terminal device 120 of the subscriber B receives the divert call with specific information which may cause on output of the generated message to the subscriber A, or the delivery of the message to subscriber A for outputting the terminal device 110. This is indicated with signal 290 in FIG. 3B.

In the above described exemplifying embodiments it is indicated that the voice message may be carried to the terminal device of the subscriber A 110 in a message e.g. referred with signals 285 and 290 in FIGS. 3A and 3B. In some embodiments of the present invention the delivery of the message represented originally with the voice message may be performed so that the sending entity, or an entity receiving the voice message at some point of the procedure, may generate a transcript of the audio message in text format. The transcript may be included within the message delivered. This kind of implementation may give the subscriber A an option not to listen the voice message if that is not suitable for the subscriber at the time of the receipt of the message, but instead the subscriber A may read what the subscriber B spoke in the audio message. Some embodiment of the invention may be implemented so that only the generated text transcript from the original voice message is included in the message delivered to the subscriber A. In order to generate the transcript of the original voice message the entity performing the generation may e.g. execute so called voice-to-text conversion function implemented e.g. with a software, wherein the original voice message is given as input and the transcript in text is output. Some non-limiting examples of the entity configured to perform the voice-to-text conversion function may e.g. be the server device 140 or the terminal device of the subscriber B 120. Some aspects of the invention relate to a system arranged to implement the method as described. The system is illustrated, at least in part, in FIG. 1. The system comprises terminal devices 110, 120 of the subscribers A and B. The terminal devices 110, 120 belonging to the system may be communicatively coupled to a mobile communication network 130. In some embodiment of the invention the system may comprise a server device 140 which may be accessed through the mobile communication network 130 either directly or indirectly. The system is established at least for providing information with a voice message to the subscriber A in response to a receipt of call connection attempt in a terminal device 120 of a subscriber B. The terminal device 120 of the subscriber B may be configured to detect 210 the call connection attempt from the subscriber A and the system may be configured to generate 220 a message comprising data carrying a dedicated voice message to the subscriber A, and output 230 the generated message to the subscriber A. The generation of the message comprising data carrying the dedicated voice message to the subscriber B may be arranged by one of the following: initiating a voice recording application for recording the dedicated voice message in response to the detection of the call connection attempt in the terminal device 120 of the subscriber B; selecting the dedicated voice message to the subscriber A among a plurality of voice messages in accordance with an identity of the subscriber A. In some embodiment, the data of the dedicated voice message may be configured to be stored in a memory of the terminal device 120 of the subscriber B. In some embodiment of the invention the stored data may be transferred to the server device 140 belonging to the system from the memory of the terminal device 120 of the subscriber B. The implementation of the system may be arranged so that the stored dedicated voice message may be output to the subscriber A in response to a receipt of an incoming call in an entity configured to store the dedicated voice message. The incoming call may be arranged to be generated by a communication network node in response to a receipt of a signal representing a predetermined state of the subscriber B with respect to the call connection attempt. The predetermined state of the subscriber B with respect to the call connection attempt may be one of the following: busy state, no answer state, which is used by the system as described.

Figure 4:
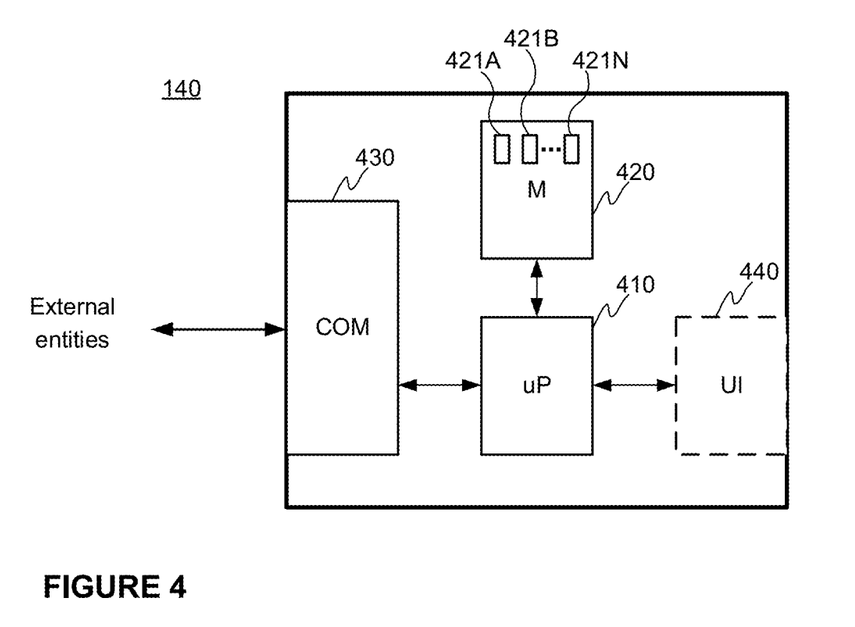
FIG. 4 illustrates schematically an example of a server device according to an embodiment of the invention.

FIG. 4 discloses an example of a server device 140 according to an embodiment of the invention. The server 140 may comprise one or more processors 410, one or more memories 420 being volatile or non-volatile for storing portions of computer program code 421a-421n and any data values, a communication interface 430 and possibly one or more user interface units 440. The mentioned elements are communicatively coupled to each other with e.g. an internal bus. The communication interface provides interface for communication with any external units needed in a certain implementation of the present invention as described, such as with one or more network nodes implementing a communication channel to the server or any user equipment. The communication interface may be based on one or more known communication technologies, either wired or wireless, in order to exchange pieces of information.

The processor 410 of the server 140 is at least configured to implement at least some steps of the solution as described. The implementation of the method may be achieved by arranging the processor 410 to execute at least some portion of computer program code 421a-421n stored in the memory 420 causing the processor 410, and thus the server 140, to implement one or more method steps as described. The processor 410 is thus arranged to access the memory 420 and retrieve and store any information therefrom and thereto. Moreover, the processor 410 is configured to control the communication through the communication interface 430 with any external unit, such as with the sensors. The processor 410 may also be configured to control the output of information, i.e. data. The processor 410 may also be configured to control storing of received and delivered information. For sake of clarity, the processor herein refers to any unit suitable for processing information and control the operation of the apparatus, among other tasks. The mentioned operations may e.g. be implemented with a microcontroller solution with embedded software. Similarly, the invention is not limited to a certain type of memory only, but any memory type suitable for storing the described pieces of information, or data, may be applied in the context of the present invention.

An example of the invention also relates to a non-transitory computer-readable storage medium, which stores at least portions of computer program code, wherein the portions of computer program code are computer-executable to implement the method steps of a system of the subscriber A as described. In general, the computer-readable storage medium may include a storage medium or memory medium, such as magnetic or optical media e.g. disc, DVD/CDROM, volatile or non-volatile media, such as RAM. The computer program code may be written in any form of programming language, including compiled or interpreted languages, and the computer program may be deployed in any form, including as a stand-alone program or as a subroutine, element or other unit suitable for use in a computing environment. A computer program code may be deployed to be executed on one processor or on a plurality of processors arranged in at least one network node belonging to the system.

The terminal devices 110, 120 of the subscribers comprises necessary processing resources, memory resources and communication interfaces for using services provided by the mobile communication network. The use of the services of the mobile communication network may require that the terminal device 110, 120 is equipped with a subscriber identity module storing data, such as subscriber identity and security related information, for accessing the mobile communication network 130. The memory resources may store application data which is executed by the processing resources in order to perform at least some portions of the method according to the invention.

In the description above it is assumed that the call connection attempt is made over only one mobile communication network 130. However, the invention is not anyhow limited in this regard, but the call connection attempt, and the signaling according to the present invention, may be conveyed over a plurality of communication networks serving the subscribers.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for providing information with a voice message to a subscriber A in response to a receipt of a call connection attempt in a terminal device of a subscriber B delivered over a mobile communication network, the method comprising:
   detecting the call connection attempt delivered over the mobile communication network from the subscriber A in the terminal device of the subscriber B;
   detecting the subscriber A based on the call connection attempt by an identifier of the subscriber A in the terminal device of the subscriber B;
   generating a message comprising data carrying a dedicated voice message to the subscriber A, the message being generated by the terminal device of the subscriber B and transferred to a server device accessible over the mobile communication network; and
   outputting the generated message to the subscriber A from the server device based on the identifier of the subscriber A detected in accordance with the call connection attempt.

2. The method of claim 1, wherein generation of the message comprising data carrying the dedicated voice message to the subscriber B is performed by one of the following: initiating a voice recording application for recording the dedicated voice message in response to the detection of the call connection attempt in the terminal device of the subscriber B, and selecting the dedicated voice message to the subscriber A among a plurality of voice messages in accordance with an identity of the subscriber A.

3. The method of claim 2, wherein generation of the message comprising data carrying a dedicated voice message to the subscriber A further comprises generating a transcript of the voice message by a voice-to-text conversion function.

4. The method of claim 2, wherein the identity of the subscriber A is an identity of the mobile communication network.

5. The method of claim 4, wherein generation of the message comprising data carrying a dedicated voice message to the subscriber A further comprises generating a transcript of the voice message by a voice-to-text conversion function.

6. The method of claim 1, wherein the data of the dedicated voice message is stored in a memory of the terminal device of the subscriber B.

7. The method of claim 6, wherein generation of the message comprising data carrying a dedicated voice message to the subscriber A further comprises generating a transcript of the voice message by a voice-to-text conversion function.

8. The method of claim 6, wherein the stored data is transferred to a server device from the memory of the terminal device of the subscriber B.

9. The method of claim 8, wherein generation of the message comprising data carrying a dedicated voice message to the subscriber A further comprises generating a transcript of the voice message by a voice-to-text conversion function.

10. The method of claim 6, wherein the stored dedicated voice message is output to the subscriber A in response to a receipt of an incoming call in an entity storing the dedicated voice message, and
   wherein the incoming call is generated by a communication network node in response to a receipt of a signal representing a predetermined state of the subscriber B with respect to the call connection attempt.

11. The method of claim 10, wherein the predetermined state of the subscriber B with respect to the call connection attempt is one of the following: a busy state, and a no answer state.

12. The method of claim 1, wherein generation of the message comprising data carrying a dedicated voice message to the subscriber A further comprises generating a transcript of the voice message by a voice-to-text conversion function.

13. A non-transitory computer-readable storage medium having computer-executable program code instructions stored therein for performing the method of claim 1 when the computer program product is executed on at least one network node.

14. A system comprising:
   a terminal device for a subscriber A; and
   a terminal device for a subscriber B,
   the terminal devices being communicatively coupled to a mobile communication network for providing information with a voice message to the subscriber A in response to a receipt of call connection attempt in the terminal device of the subscriber B delivered over the mobile communication network,
   wherein the terminal device of the subscriber B detects the call connection attempt delivered over the mobile communication network from the subscriber A, detects the subscriber A based on the call connection attempt by an identifier of the subscriber A in the terminal device of the subscriber B, and the terminal device of the subscriber B generates a message comprising data carrying a dedicated voice message to the subscriber A and transfers the message to a server device accessible over the mobile communication network, and
   the generated message is output to the subscriber A from the server device based on the identifier of the subscriber A detected in accordance with the call connection attempt.

15. The system of claim 14, wherein generation of the message comprising data carrying the dedicated voice message to the subscriber B is performed by one of the following: initiating a voice recording application for recording the dedicated voice message in response to the detection of the call connection attempt in the terminal device of the subscriber B, and selecting the dedicated voice message to the subscriber A among a plurality of voice messages in accordance with an identity of the subscriber A.

16. The system of claim 14, wherein the data of the dedicated voice message is stored in a memory of the terminal device of the subscriber B.

17. The system of claim 16, wherein the stored data is transferred to a server device belonging to the system from the memory of the terminal device of the subscriber B.

18. The system of one of the claim 16, wherein the stored dedicated voice message is output to the subscriber A in response to a receipt of an incoming call in an entity configured to store the dedicated voice message, and wherein the incoming call is generated by a communication network node in response to a receipt of a signal representing a predetermined state of the subscriber B with respect to the call connection attempt.

19. The system of claim 18, wherein the predetermined state of the subscriber B with respect to the call connection attempt is one of the following: a busy state, and a no answer state.

20. The system of claim 14, further comprising a voice-to-text conversion function for generating a transcript of the voice message when generating the message comprising data carrying a dedicated voice message to the subscriber A.

\* \* \* \* \*